April 13, 1926.
G. W. LOVEQUIST ET AL
1,580,618
NOZZLE FOR FORCE FEED LUBRICATORS
Filed July 24, 1923
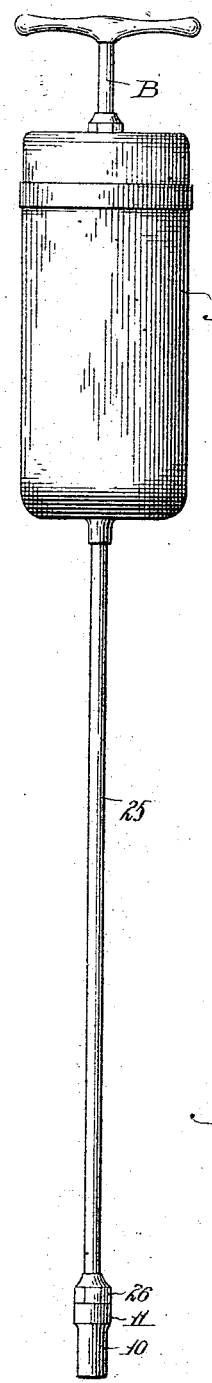
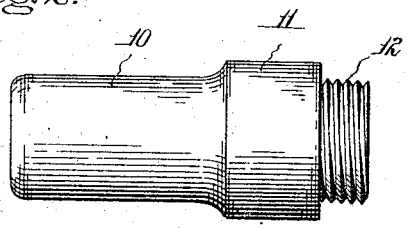
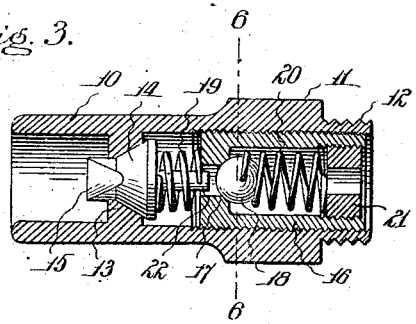
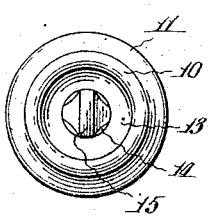 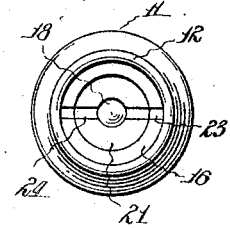
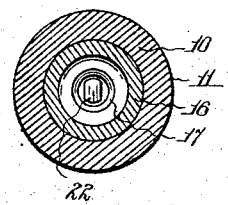
Inventors
George W. Lovequist.
John H. George.
By John D Thomas Co
Attorneys Patented Apr. 13, 1926.

1,580,618

UNITED STATES PATENT OFFICE.

GEORGE W. LOVEQUIST AND JOHN H. GEORGE, OF BRADFORD, PENNSYLVANIA.

NOZZLE FOR FORCE-FEED LUBRICATORS.

Application filed July 24, 1923. Serial No. 653,523.

*To all whom it may concern:*

Be it known that we, GEORGE W. LOVEQUIST and JOHN H. GEORGE, citizens of the United States, residing at Bradford, in the county of McKean and State of Pennsylvania, have invented a Nozzle for Force-Feed Lubricators, of which the following is a full and complete specification.

Our invention relates to the general class of hose couplings and is more especially an improvement in the coupling device or nozzle attached to the outer end of a hose used in connection with high pressure lubricating systems, including forced feed lubricating devices operated by hand.

The principal object of our invention is to provide a coupling device or nozzle of this particular character with a form of valve which is normally closed to prevent escape of the oil and will open automatically to discharge when the nozzle is connected to the nipple or other device cooperating therewith in this improved method of oiling parts of machinery, the valved nozzle permitting pressure to be maintained in the system or hose pipe at all times inasmuch as the valve automatically closes when the nozzle is uncoupled.

Our invention contemplates forming the body of the nozzle similar in design to the ordinary form of nozzle with which lubricating systems and devices are supplied so as to be readily substituted therefor and provide a more effective and convenient operation of the lubricating system or device.

Our invention consists in the particular form of valve mechanism within the nozzle to automatically regulate the discharge of oil; all as hereinafter fully described and more specifically set forth in the appended claims.

In the accompanying drawings:

Fig. 1 is an elevation illustrating the application of the nozzle to a common form of forced feed lubricator.

Fig. 2 is a detail side view of the nozzle.

Fig. 3 is a longitudinal sectional view through the nozzle to show the valve mechanism.

Fig. 4 is a front end view of the nozzle.

Fig. 5 is a rear end view thereof.

Fig. 6 is a sectional view on the line 6—6 of Fig. 3.

In carrying out the present form of our invention we provide a casing 10, preferably cylindrical in shape or similar to the ordinary form of nozzle with an integral flange 11 near its outer end to form an abutting shoulder beyond which it is threaded, as at 12, for attachment to the end of a hose or other appliance to which it may be applied. The casing is bored centrally from each end to leave an integral valve-seat 13 properly located with respect to the outer or forward end of said casing for the purpose hereinafter explained, said valve-seat having a tapered opening therethrough wider at its rear end and into which is adapted to seat a correspondingly-shaped valve-plug 14. That portion of the bore in front of the valve-seat is plain to receive the usual nipple (not shown) or other device with which the nozzle cooperates in oiling, and for like cooperation the plug 14 is provided with a forwardly-projecting member 15 with which the nipple engages to open this valve as well as the ball-valve of said nipple, as will be understood, the location of the valve 13—14 in the nozzle providing that the end of the nipple contact with the face of the valve-seat 13 to prevent leakage between the coupled parts. That portion of the bore in the rear of the valve-seat 13 is threaded for a greater part of its length from the rear end of the nozzle to receive an auxiliary valve-casing 16 threaded therein, said auxiliary valve-casing being tubular in shape and provided at its inner end with a seat 17 for a ball-valve 18, the ball being within the auxiliary casing to close against the inner end of the seat so that both valves 14 and 18 close in the same direction—towards the front end of the nozzle. Both of these valves are spring-actuated for normally closing the same, the spring 19 for closing plug-valve 14 being interposed between said valve and the auxiliary valve-casing 16, while spring 20 for closing the ball-valve is interposed between the latter and a collar 21 threaded into the outer end of the tubular valve casing, and it will be noted that an adjustment of spring tension is provided for in both instances—with respect to spring 19 by turning the auxiliary valve-casing and with respect to spring 20 by turning the collar. For opening ball-valve 18 there is formed on the plug-valve 14 a rearwardly-projecting stem 22 working in the opening through the valve-seat 17, the length of said stem being such that it will automatically open the ball-valve when the plug-valve is opened by the nipple with which the nozzle is coupled, and to permit the oil to flow freely through the ball-valve when it is opened the stem 22 is flattened (Fig. 6), while for like purpose or to permit the oil to flow freely by the plug-valve the forwardly-projecting operating-member 15 thereof is also flattened (see Figs. 3 and 4).

For convenience in assembling the parts of the nozzle and to facilitate adjustment of the valve-casing 16 and bearing-collar 21 in regulating the tension of the springs the outer ends of said valve-casing and collar are provided with transverse notches 23 and 24 respectively as shown in Fig. 5 of the drawings.

It will be understood that in practice only slight pressure is exerted by the springs on the cooperating valves in the nozzle for in using the nozzle in connection with a high pressure lubricating system or forced feed lubricating device the pressure of the oil in the said nozzle will tend to close the valves irrespective of the springs, and therefore the latter are of particular service when there is little or no pressure of oil in the hose and nozzle.

The valved hose coupling or nozzle hereinbefore described is applied to the end of a hose, as 25, forming part of the conventional types of high pressure lubricating systems, being screwed into the usual nut, as 26, and though we have in the drawings shown it applied to a well known type of portable forced feed lubricator operable by hand and consisting of reservoir A and screw-threaded rod B operating plunger (not shown) it will be obvious the same may be used with any other lubricating device or system, for in supplying oil to machinery by way of the ordinary valved nipple it is necessary only to slip the nozzle over said nipple when the ball in the outer end of the latter will automatically open the cooperating valves in the nozzle to permit the flow of oil. After the required quantity of oil has been supplied the nozzle is removed and the valves therein will quickly close automatically or as soon as the pressure on the operating-member 15 is relieved to thereby cut off the discharge of oil while permitting pressure of oil in the hose to be maintained, in the present instance the two valves in the nozzle operating conjointly to more effectually cut off the discharge from the nozzle.

The construction and arrangement of the valve mechanism herein shown and described provides a simple, cheap and effective nozzle or hose coupling device for lubricating devices that will greatly facilitate the operation of supplying oil to machinery, as for instance the crank-case of an automobile, and although we have particularly mentioned its use in connection with the usual nipple on the crank-case it is operable in connection with any other device forming part of the machinery to be oiled and having a projection that will enter the outer end of the nozzle and press upon the member 15 that operates the two valves in said nozzle.

We claim:

1. A hose coupling for pressure feed lubricators comprising a valve-casing having an integral valve-seat therein intermediate its ends with a tapered opening through said valve-seat narrowing towards the front end of the casing, the portion of the bore of said casing in the rear of the valve-seat being threaded from its rear end, a valve plug seating in the valve-seat and having a forwardly projecting operating member and a rearwardly projecting stem, an auxiliary valve-seat threaded into the rear end of the valve-casing and adjustable therein with respect to the aforementioned valve-seat, the opening through said auxiliary valve-seat receiving the stem of the valve-plug, and a spring-actuated ball-valve seating in the auxiliary valve-seat and adapted to be opened by the stem of the valve plug.

2. A hose coupling for pressure feed lubricators comprising a valve-casing having an integral valve-seat therein and internally threaded in the rear of said valve-seat, a plug valve seating in said valve-seat and having a forwardly projecting operating member and a rearwardly projecting stem, a sleeve threaded in the rear portion of the casing and having a valve-seat at its inner end into which the stem of the plug valve projects, said sleeve being adjustable to vary the position of its valve-seat with respect to the integral valve-seat in the casing, a ball within the sleeve cooperating with the valve-seat thereof, an apertured plug threaded in the outer end of the sleeve, and a spring interposed between the plug and ball, whereby the ball-valve is adjustable with respect to the plug-valve and the action of the spring against the ball-valve may be varied.

GEORGE W. LOVEQUIST.
JOHN H. GEORGE.